(12) United States Patent
Oono

(10) Patent No.: US 6,889,666 B2
(45) Date of Patent: May 10, 2005

(54) FUEL PRESSURE CONTROL APPARATUS FOR CYLINDER INJECTION TYPE INTERNAL COMBUSTION ENGINE

(75) Inventor: Takahiko Oono, Hyogo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 10/775,062

(22) Filed: Feb. 11, 2004

(65) Prior Publication Data

US 2005/0061297 A1 Mar. 24, 2005

(30) Foreign Application Priority Data

Sep. 22, 2003 (JP) ........................................ 2003-329943

(51) Int. Cl.$^7$ ............................................. F02M 37/04
(52) U.S. Cl. ...................................... 123/514; 123/458
(58) Field of Search ............................... 123/514, 458, 123/456, 295, 305

(56) References Cited

U.S. PATENT DOCUMENTS

RE36,119 E * 3/1999 Kunishima et al. ......... 123/516
6,539,921 B1 * 4/2003 Matsumura ................. 123/456
6,715,470 B2 * 4/2004 Takahashi ................... 123/458

FOREIGN PATENT DOCUMENTS

JP 07-253041 A 10/1995

* cited by examiner

Primary Examiner—Mahmoud Gimie
(74) Attorney, Agent, or Firm—Sughrue Mion, PLLC

(57) ABSTRACT

A fuel pressure control apparatus for a cylinder injection type engine capable of restarting the engine without fail notwithstanding increase of fuel pressure due to temperature rise immediately after stoppage of engine operation. Fuel is supplied from a high pressure fuel pump (5) to a fuel rail (2) to be injected by fuel injection valves (1) into combustion chambers (20) of cylinders. An ECU (10) estimates increment ($\Delta P$) of the fuel pressure (PF) within the fuel rail (2) after stoppage of the engine operation on the basis of a water temperature (THW) and an intake air temperature (THA) to restrict a maximum value of a desired fuel pressure (Po) so that a sum value (PM) of the desired fuel pressure (Po) and the increment ($\Delta P$) does not exceed the critical actuation pressure (Pi) of the fuel injection valve (1).

4 Claims, 7 Drawing Sheets

FUEL PRESSURE CONTROL APPARATUS FOR CYLINDER INJECTION TYPE INTERNAL COMBUSTION ENGINE

BACKGROUND OF THE INVENTION

1. Field of the Invention

The present invention relates to a fuel pressure control apparatus for a cylinder injection type internal combustion engine installed on an automobile or motor vehicle. More particularly, the present invention is concerned with the fuel pressure control apparatus for the cylinder injection type internal combustion engine which apparatus is designed to prevent the failure of engine starting operation ascribable to the actuation failure of a fuel injection valve which may occur when the pressure of fuel (hereinafter referred to as the fuel pressure) increases as the temperature of the internal combustion engine rises after the stoppage of operation thereof, to thereby ensure the restart of engine operation with high reliability without degrading the ordinary engine operation performance.

2. Description of Related Art

In general, in the cylinder injection type internal combustion engine equipped with a fuel injection system for supplying the fuel to the individual engine cylinders by injecting directly the pressurized fuel into the combustion chambers defined within the cylinders through the fuel injection valves, respectively, the temperature of the fuel remaining within a fuel rail of the fuel injection system rises under the action of heat emanated from the engine and the exhaust system thereof after the engine has been stopped (after the stoppage of the motor vehicle) because cooling by the air stream or wind generated by a cooling fan and the running motor vehicle itself is no more available after the engine operation has been stopped.

In that case, the inner space of the fuel rail remains in the hermetically closed state with the capacity thereof unchanged after the stoppage of the engine operation. Consequently, the fuel pressure within the fuel rail increases due to the thermal expansion of the fuel remaining within the fuel rail. In this conjunction, it is noted that the fuel pressure attainable after the stoppage of the engine operation is naturally high when the fuel pressure at the time point the engine was stopped is high.

Such being the circumstances, when the engine operation is to be restarted from the state where a high fuel pressure prevails internally of the fuel rail shortly after the engine operation was stopped, magnitude of the force acting on a valve element of the fuel injection valve will exceed that of the driving or actuating force applied to the valve element for opening the fuel injection valve, as a result of which such situation will be incurred that the fuel injection valve can not normally operate and hence the operation of the internal combustion engine and the motor vehicle may possibly be disabled to restart, giving rise to a great inconvenience.

In particular, in the case of the cylinder injection type internal combustion engine, the fuel pressure is set at a relatively high level. Consequently, the probability of occurrence of the problem brought about by the increase of the fuel pressure within the fuel rail in succession to or after the stoppage of engine operation is remarkably high.

With a view to solving the problem mentioned above for thereby ensuring the successful restart of the engine operation, there has already been proposed such a fuel pressure control apparatus for the cylinder injection type internal combustion engine in which the temperature rise after the stoppage of engine operation is estimated on the basis of the temperature of engine cooling water and the ambient temperature at the time point when the engine operation is stopped. In that case, if the maximum reachable value of the fuel pressure within the fuel rail is expected to exceed a predetermined fuel pressure level or value due to the temperature rise as estimated, the fuel is then injected through the fuel injection valve immediately after the stoppage of the engine operation to thereby allow the fuel pressure within the fuel rail to lower. For more particulars, reference may have to be made to Japanese Patent No. 3289472, for example.

In other words, the conventional fuel pressure control apparatus mentioned above is so arranged that when the maximum reachable value of the fuel pressure within the fuel rail as estimated reaches or exceeds a critical pressure (i.e., pressure beyond which actuation of the fuel injection valve becomes disabled), the fuel injection is continued even after the stoppage of engine operation to thereby lower or reduce the fuel pressure within the fuel rail so that the fuel pressure within the fuel rail does not reach the critical pressure at which the actuation of the fuel injection valve is disabled regardless of the fuel temperature rise within the fuel rail.

As will now be appreciated from the above, with the conventional fuel pressure control apparatus for the cylinder injection type internal combustion engine, the engine operation is continued even after the input of a command of stopping the engine operation by an operator or driver of the motor vehicle when the fuel pressure within the fuel rail is expected to reach or exceed the critical pressure, as is disclosed in Japanese Patent No. 3289472 cited above. Consequently, the intention of the driver to stop the engine operation instantaneously upon his or her manipulation for inputting the engine stoppage command can not be realized, incurring a great inconvenience as a practical matter. In other words, the measures for solving the problem described above lacks practicality.

SUMMARY OF THE INVENTION

In the light of the state of the art described above, it is an object of the present invention to provide a fuel pressure control apparatus for a cylinder injection type internal combustion engine which apparatus is capable of solving successfully the problem of the engine start failure which may occur due to the increase of the fuel pressure within the fuel rail in accompanying the temperature rise after the stoppage of the engine operation and can thus ensure an enhanced operation performance of the internal combustion engine and hence that of the motor vehicle without involving practically any inconvenience in the operation of the engine as well as the motor vehicle.

In view of the above and other objects which will become apparent as the description proceeds, there is provided according to a general aspect of the present invention a fuel pressure control apparatus for a cylinder injection type internal combustion engine, which apparatus includes fuel injection valves for injecting fuel directly into combustion chambers of individual cylinders, respectively, of the internal combustion engine, a fuel rail connected to the fuel injection valves for containing the fuel of a high pressure, a fuel pressure sensor for detecting the pressure of the fuel contained within the fuel rail as a fuel pressure, an intake air temperature sensor for detecting a temperature of intake air of the internal combustion engine or alternatively an ambient temperature thereof as an intake air temperature, a water temperature sensor for detecting a temperature of cooling water of the internal combustion engine as a water temperature, a high pressure fuel pump for supplying the fuel of high pressure to the fuel rail, a fuel pressure control means for variably controlling the fuel pressure so that the fuel pressure coincides with a desired fuel pressure which conforms to an operation state of the internal combustion engine, and a fuel pressure increase estimating means for estimating an increment of the fuel pressure after stoppage of operation of the internal combustion engine on the basis of the intake air temperature and the water temperature detected during operation of the internal combustion engine.

The fuel pressure control means mentioned above includes a desired fuel pressure limiting means for limiting a maximum value of the desired fuel pressure so that a sum value of the desired fuel pressure and the increment of the fuel pressure does not exceed a critical actuation pressure of the fuel injection valve beyond which a failure of fuel injection may occur.

By virtue of the arrangement of the fuel pressure control apparatus described above, operation of the internal combustion engine is stopped in response to the engine stop manipulation. Further, even when the fuel pressure within the fuel rail increases after the stoppage of the engine in accompanying the temperature rise, the fuel pressure within the fuel rail can not reach the critical actuation level of the fuel injection valve. Thus, the engine operation can be restarted with high reliability without impairing the engine operation performance upon stoppage of the engine.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Figure 1:
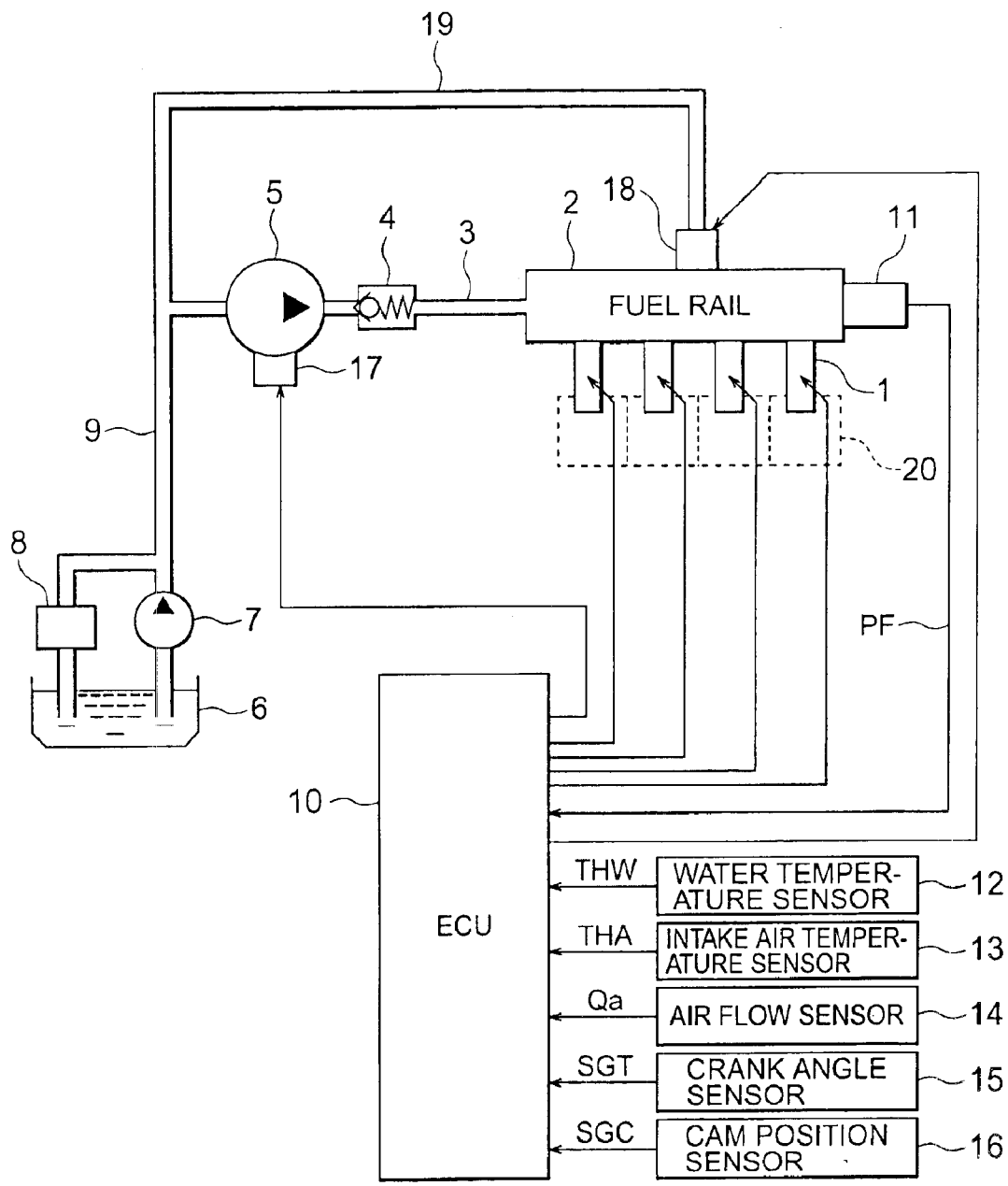
FIG. 1 is a view showing generally and schematically an arrangement of a fuel pressure control apparatus for a cylinder injection type internal combustion engine according to a first embodiment of the present invention.

The present invention will be described in detail in conjunction with what is presently considered as preferred or typical embodiments thereof by reference to the drawings. In the following description, like reference characters designate like or corresponding parts throughout the several views.

Embodiment 1

Now, description will e made of the fuel pressure control apparatus for the cylinder injection type internal combustion engine according to a first embodiment of the present invention with attention being primarily given to the fuel injection system.

FIG. 1 is a view showing generally and schematically an arrangement of the fuel pressure control apparatus according to the first embodiment of the invention with consideration being primarily paid to the fuel injection system.

Referring to FIG. 1, individual cylinders of the internal combustion engine are provided with fuel injection valves 1, respectively, for directly injecting the pressurized fuel into combustion chambers 20 defined internally of the cylinders, respectively. Each of the fuel injection valves 1 is connected to a fuel rail 2 which contains the fuel at a high pressure for feeding or supplying the pressurized fuel to the fuel injection valves 1, respectively.

A fuel inlet port of the fuel rail 2 is connected to a high pressure pipe 3 which in turn is communicated with a high pressure fuel pump 5 disposed upstream of the fuel rail 2 with a check valve 4 being interposed between the fuel rail 2 and the high pressure fuel pump 5.

The high pressure fuel pump 5 serves to pressurize the fuel which is supplied from a fuel tank 6 to thereby supply the fuel of high pressure to the fuel rail 2.

The fuel tank 6 is connected to a low pressure pipe 9 by way of a low pressure fuel pump 7 and a low pressure regulator 8. The fuel contained within the fuel tank 6 is supplied to the high pressure fuel pump 5 through the low pressure pipe 9.

An electronic control unit (hereinafter also referred to simply as the ECU) 10 which may be constituted by a microprocessor or microcomputer is designed or programmed to execute arithmetic operations for effectuating various controls on the basis of various sensor signals derived from the outputs of a fuel pressure sensor 11, a water temperature sensor 12, an intake air temperature sensor 13, an air flow sensor 14, a crank angle sensor 15, a cam position sensor 16, etc., for thereby driving or actuating the individual fuel injection valves 1 and various actuators of a discharge quantity control valve 17, an electromagnetic pressure control valve 18 and others, respectively.

The fuel pressure sensor 11 serves to detect the pressure prevailing within the fuel rail 2 as a fuel pressure PF.

The water temperature sensor 12 serves for detecting the temperature of cooling water of the internal combustion engine as a water temperature THW.

The intake air temperature sensor 13 serves to detect the temperature of intake air (also called the inlet air) of the internal combustion engine or the ambient temperature as an intake air temperature THA. In this conjunction, it is assumed that the intake air temperature sensor 13 is disposed in the intake pipe (not shown) of the internal combustion engine.

The air flow sensor 14 serves for detecting the quantity Qa of the intake air sucked into the internal combustion engine.

The crank angle sensor 15 serves to generate a crank angle signal SGT indicative of a reference crank angle position and an engine rotation number or engine speed (rpm).

The cam position sensor 16 serves to generate a cam angle signal SGC for discriminatively identifying the individual cylinders from one to another.

The discharge quantity control valve 17 serves to control a discharge quantity of the high pressure fuel pump 5 under the control of the ECU 10.

The electromagnetic pressure control valve 18 is constituted by a normally closed type switching valve which is opened under the control of the ECU 10 for controlling a return quantity of the fuel within the fuel rail 2.

The electromagnetic pressure control valve 18 is provided with a return pipe 19 which is communicated to the fuel tank 6 on the discharge side and the high pressure fuel pump 5 on the inlet side thereof.

Figure 2:
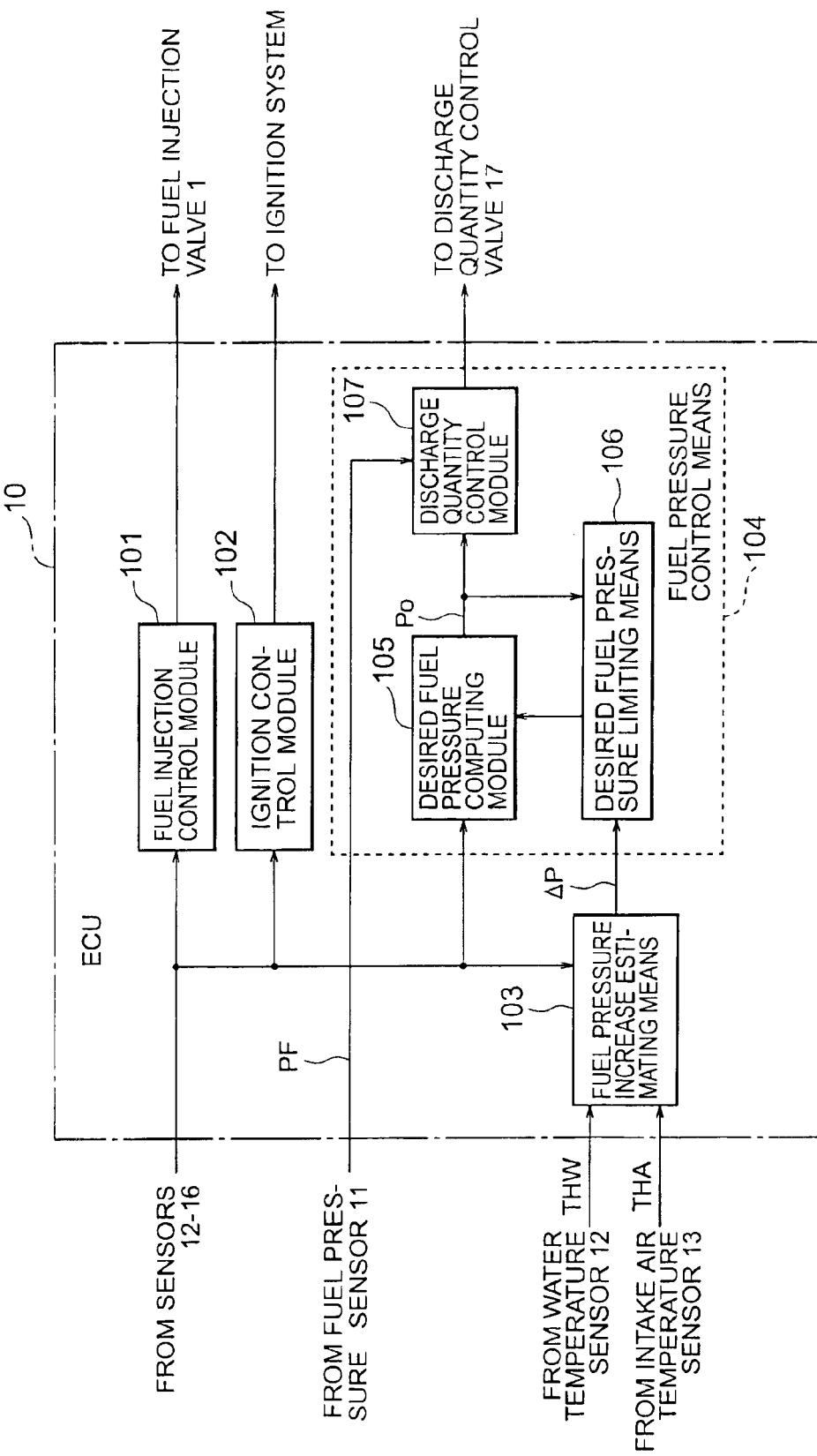
FIG. 2 is a block diagram showing a functional configuration of an electronic control unit (ECU) according to the first embodiment of the invention.

FIG. 2 is a functional block diagram showing a configuration of the ECU 10 according to the first embodiment of the present invention.

Referring to FIG. 2, the ECU 10 is comprised of a fuel injection control module 101 programmed for arithmetic operation to control generation of an actuating signal for driving or actuating the fuel injection valve 1 on the basis of various sensor informations (indicating the engine operation state), an ignition control module 102 programmed for arithmetic operation to control generation of a drive signal to drive the ignition system (not shown) on the basis of the engine operation state information, a fuel pressure increase estimating means 103 programmed for arithmetically estimating the degree of increase of the fuel pressure (referred to as the fuel pressure increment) $\Delta P$, and a fuel pressure control means 104 programmed for arithmetic operation to control generation of an actuating signal for driving or actuating the discharge quantity control valve 17 on the basis of the engine operation state information.

In more concrete, the fuel pressure increase estimating means 103 incorporated in the ECU 10 is designed to estimate the increment $\Delta P$ of the fuel pressure PF after the stoppage of the engine operation on the basis of the intake air temperature THA and the water temperature THW detected during the operation of the engine.

In the fuel pressure control apparatus now under consideration, the fuel pressure increase estimating means 103 is supplied with at least the intake air temperature THA and the water temperature THW as the input information. It should however be appreciated that other sensor information (indicating the engine operation state) may be supplied to the fuel pressure increase estimating means 103 as the input information, as the case may be for estimating the fuel pressure increment $\Delta P$ with higher accuracy.

The fuel pressure control means 104 incorporated in the ECU 10 is composed of a desired fuel pressure computing module 105 for arithmetically determining or computing a desired fuel pressure Po which conforms to the operation state of the internal combustion engine, a desired fuel pressure limiting means 106 for limiting the desired fuel pressure Po up to the critical actuation pressure (i.e., pressure beyond which actuation of the fuel injection valve becomes disabled) Pi of the fuel injection valve 1, and a discharge quantity control module 107 for driving or actuating the discharge quantity control valve 17 so that the detected fuel pressure PF coincides with the desired fuel pressure Po. Thus, the fuel pressure control means 104 serves for variably controlling the fuel pressure PF that it coincides with the desired fuel pressure Po.

The desired fuel pressure limiting means 106 incorporated in the fuel pressure control means 104 is programmed or designed for limiting the maximum value of the desired fuel pressure Po so that a sum value PM of the desired fuel pressure Po and the increment $\Delta P$ of the fuel pressure PF (i.e., PM=Po+$\Delta P$) remains equal to or lower than a predetermined value (the critical actuation pressure Pi of the fuel injection valve 1).

Next, description will turn to the basic fuel injection operation carried out by the fuel pressure control apparatus according to the first embodiment of the invention shown in FIGS. 1 and 2.

During the operation of the internal combustion engine, the fuel contained in the fuel tank 6 is pumped by the low pressure fuel pump 7 to be fed to the high pressure fuel pump 5 through the low pressure pipe 9 after having been regulated to a predetermined fuel pressure of low level (e.g. 0.4 MPa) by means of the low pressure regulator 8.

The high pressure fuel pump 5 functions to increase the pressure of the fuel charged through the low pressure pipe 9 so that the pressurized fuel is discharged from the high pressure fuel pump 5.

The fuel of high pressure discharged from the high pressure fuel pump 5 is supplied to the fuel rail 2 by way of the check valve 4 and the high pressure pipe 3 to be injected into the combustion chambers 20 of the individual engine cylinders by means of the fuel injection valves 1, respectively.

The fuel pressure control means 104 incorporated in the ECU 10 is designed or programmed to for control the fuel quantity discharged from the high pressure fuel pump 5 by activating the discharge quantity control valve 17 to thereby control the fuel pressure PF prevailing within the fuel rail 2 so that the fuel pressure PF coincides with the desired fuel pressure Po which conforms to the operation state of the internal combustion engine (i.e., engine load, rotation number (rpm), etc.).

Further, the ECU 10 controls the valve open time of the fuel injection valve 1 (i.e., time duration for which the fuel injection valve 1 is opened) by means of the fuel injection control module 101 to thereby control the amount or quantity of the fuel to be charged into each of the cylinders. Besides, the ECU 10 drives the ignition system by the ignition control module 102 to perform the ignition control while carrying out various basic controls of the internal combustion engine by driving the other various actuators.

The fuel pressure increase estimating means 103 also incorporated in the ECU 10 is programmed or designed to estimate the increment $\Delta P$ of the fuel pressure PF within the fuel rail 2 which is brought about by the temperature rise after stoppage of the engine operation on the basis of the various sensor information indicative of the engine operation state.

For performing the controls described above, there are inputted to the ECU 10 the detection signal outputted from the fuel pressure sensor 11 (signal indicating the fuel pressure PF), the detection signal outputted from the water temperature sensor 12 (signal indicating the water temperature THW), the signal outputted from the intake air temperature sensor 13 indicating the intake air temperature THA (or ambient temperature) outputted from the intake air temperature sensor 13, the detection signal from the air flow sensor 14 (signal indicating the intake air quantity Qa), the pulse signal generated by the crank angle sensor 15 and indicating the crank rotation angle (i.e., crank angle signal SGT), and a cylinder identifying signal from the cam position sensor 16 (i.e., cam angle signal SGC), as described previously.

The ECU 10 is electrically connected to the various actuators of the fuel injection valve 1, the discharge quantity control valve 17 and others for actuating the fuel injection valve 1, the discharge quantity control valve 17 and others in dependence on the operation state of the internal combustion engine to thereby control the amount or quantity of the fuel injected through the fuel injection valve 1, the fuel quantity (fuel pressure PF) discharged from the high pressure pipe 3 and others.

More specifically, the fuel pressure control means incorporated in the ECU 10 variably controls the fuel pressure PF within the fuel rail 2 to the pressure level or value in the range, for example, of 5 MPa to 10 MPa in the ordinary operation of the internal combustion engine. As a result of this, the fuel pressure PF at the time point the engine operation is stopped is so controlled as to assume a given one of the levels lying within the range of about 5 MPa to 10 MPa in accordance with the desired fuel pressure Po in the operation state immediately before the engine operation is stopped.

On the other hand, after the stoppage of the engine operation, the fuel pressure PF controlled up to the time point immediately preceding the stoppage of the engine operation is held as the initial value. However, when the temperature of the fuel rises due to the heat transfer from the engine itself and the exhaust system, the fuel pressure PF prevailing within the fuel rail 2 increases from the fuel pressure value prevailing at the time point the engine operation was stopped due to thermal expansion of the fuel.

Next, operation of the fuel pressure increase estimating means 103 and the desired fuel pressure limiting means 106 incorporated in the ECU 10 will be described in more concrete.

Figure 3:
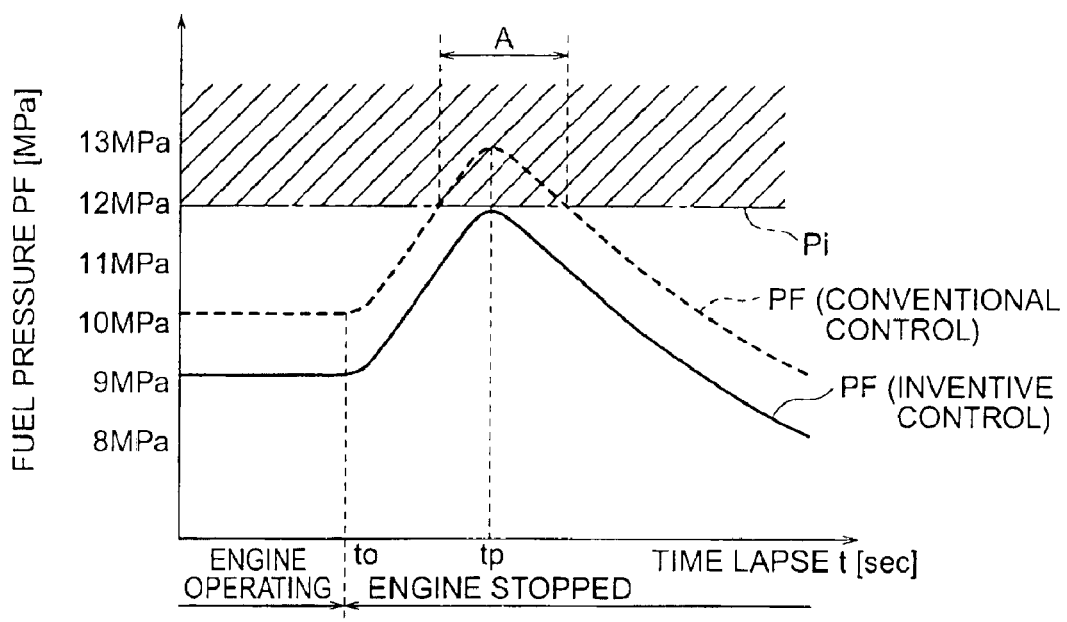
FIG. 3 is a view for graphically illustrating fuel pressure increase characteristics after stoppage of an engine operation.

FIG. 3 is a view for graphically illustrating operations of the fuel pressure increase estimating means 103 and the desired fuel pressure limiting means 106.

In FIG. 3, time lapse t is taken along the abscissa while taken along the ordinate is the fuel pressure PF prevailing within the fuel rail 2. Further, a solid line curve in the figure represents the change of the fuel pressure PF as a function of time lapse in the internal combustion engine equipped with the fuel pressure control apparatus according to the first embodiment of the invention, while a broken line curve represents the change of the fuel pressure PF as a function of time lapse in the state where the engine is operating with the fuel pressure PF being limited to the maximum value (10 MPa) of the desired fuel pressure Po and subsequently the engine operation is stopped at a time point to, which is then followed by the increase of the fuel pressure PF up to or higher than the critical actuation pressure Pi of the fuel injection valve 1 in the internal combustion engine equipped with the conventional fuel pressure control apparatus.

With the control operation carried out by the conventional control apparatus, the fuel pressure within the fuel rail 2 increases as a function of time t from the initial value of about 10 MPa as of the time point to at which the engine operation is stopped, attains a level of about 13 MPa at a time point tp after lapse of a given time and decreases after the time point tp as the temperature of the engine lowers, as indicated by the dotted line curve labeled "PF (conventional control)" in FIG. 3.

In this conjunction, however, it is noted that operation of the fuel injection valve 1 is limited by the critical actuation pressure Pi (e.g. of about 12 MPa in the case of the fuel injection valve 1 shown in FIG. 1), as described previously. Accordingly, when the fuel pressure PF within the fuel rail 2 increases after the stoppage of the engine operation to exceed the critical actuation pressure Pi (=12 MPa) of the fuel injection valve 1 during a period (e.g. period A shown in FIG. 3), then the fuel injection is disabled during the period A, making it possible to restart the operation of the engine.

To cope with the problem mentioned above, it is proposed according to the teaching of the present invention incarnated in the first embodiment that when it is expected that the fuel pressure PF within the fuel rail 2 increases up to or higher than the critical actuation pressure Pi of the fuel injection valve 1 after the stoppage of the engine operation, the maximum value of the desired fuel pressure Po is limited to the level of 9 MPa at maximum with a view to preventing the engine-restart-disabled period A from occurrence, as indicated by a solid line curve labeled "PF (inventive control)".

More specifically, the fuel pressure increase estimating means 103 incorporated in the ECU 10 estimates the increment $\Delta P$ of the fuel pressure PF (i.e., degree of increase of the fuel pressure) within the fuel rail 2 as brought about by the temperature rise after the stoppage of the engine operation on the basis of the intake air temperature THA (or ambient temperature) and the water temperature THW of the engine cooling water in the state where the engine is being operated.

On the other hand, the desired fuel pressure limiting means 106 arithmetically determines in accordance with the undermentioned expression (1) a sum value of the desired fuel pressure Po (assumed, for example, 10 MPa) set in advance in dependence on the operation state of the engine and the estimated increment $\Delta P$ of the fuel pressure PF ($\Delta P$=3 MPa in the case of the example illustrated in FIG. 3) as brought about by the temperature rise after the stoppage of the engine operation.

$$Po + \Delta P = 10 \ MPa + 3 \ MPa \quad (1)$$
$$= 13 \ MPa$$

In succession, when the sum value arithmetically determined in accordance with the expression (1) exceeds the critical actuation pressure (assumed, for example, 12 MPa), the desired fuel pressure limiting means 106 predicts that the period A during which the engine restart operation after the stoppage thereof is disabled will take place and hence inputs the result of the prediction to the desired fuel pressure computing module 105 as a restriction command.

In this manner, the maximum value of the desired fuel pressure Po computed by the desired fuel pressure computing module 105 in the course of operation of the engine is so limited or restricted as to be smaller than 9 MPa inclusive, as indicated by the solid line curve in FIG. 3. As a result of this, there arises no possibility of occurrence of the engine-restart-disabled period A of the fuel injection valve 1 even if the fuel pressure PF increases at the time point tp after the stoppage of the engine operation.

Now, referring to FIG. 4, description will be made of the desired fuel pressure limit processing in more detail.

Figure 4:
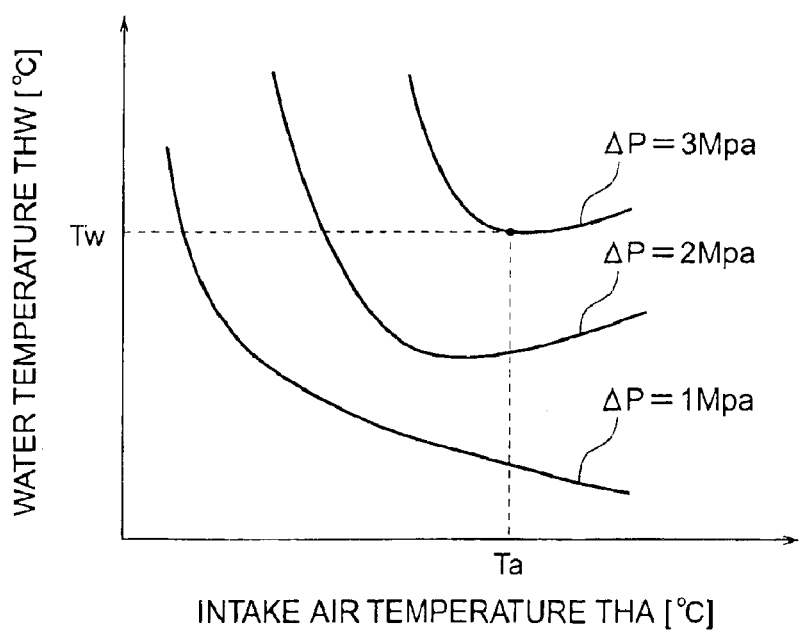
FIG. 4 is a view for graphically illustrating temperature characteristics of the fuel pressure increment after the stoppage of the engine operation.

FIG. 4 is a view for graphically illustrating correlation between the increment $\Delta P$ of the fuel pressure PF on one hand and the intake air temperature THA (taken along the abscissa) and the water temperature THW (taken along the ordinate) on the other hand after the stoppage of the engine operation. The contents of FIG. 4 are held or stored in the fuel pressure increase estimating means 103 in the form of map data.

As can be seen in FIG. 4, the increment $\Delta P$ of the fuel pressure PF after the stoppage of the engine operation tends to become large as the water temperature THW and/or the intake air temperature (ambient temperature) THA is high at the time point the engine operation is stopped.

Referring to FIG. 4, assuming that the engine is stopped at the time point when the detected water temperature and the intake air temperature detected during the engine operation are Tw and Ta, respectively, then it may be predicted that the fuel pressure increment ΔP after the stoppage of the engine operation is 3 MPa.

Accordingly, if the maximum value of the desired fuel pressure Po during the engine operation immediately preceding the stoppage of the engine operation is allowed to be up to 10 MPa, it is expected that the critical actuation pressure (12 MPa) of the fuel injection valve 1 will be exceeded after the stoppage of the engine operation.

In the case where the situation described above is expected, the desired fuel pressure limiting means 106 computes the limit value for the desired fuel pressure Po (maximum value) on the basis of the critical actuation pressure Pi (=12 MPa) of the fuel injection valve 1 and the increment ΔP (=3 MPa) of the fuel pressure PF in accordance with the undermentioned expression (2), the computed limit value being then supplied to the desired fuel pressure computing module 105 as the restriction command.

$$Pi - \Delta P(3\ MPa) = 12\ [MPa] - 3\ [MPa] \quad (2)$$
$$= 9\ [MPa]$$

By limiting the desired fuel pressure Po to the upper limit value of 9 MPa, as can be seen from the expression (2), the maximum reachable fuel pressure after the stoppage of the engine operation is prevented from exceeding the critical actuation pressure Pi of the fuel injection valve 1, whereby occurrence of the engine-restart-disabled period A after the stoppage of the engine operation is prevented.

Next, referring to the flow chart shown in FIG. 5, the control operation of the fuel pressure control apparatus according to the first embodiment of the invention will be described.

Figure 5:
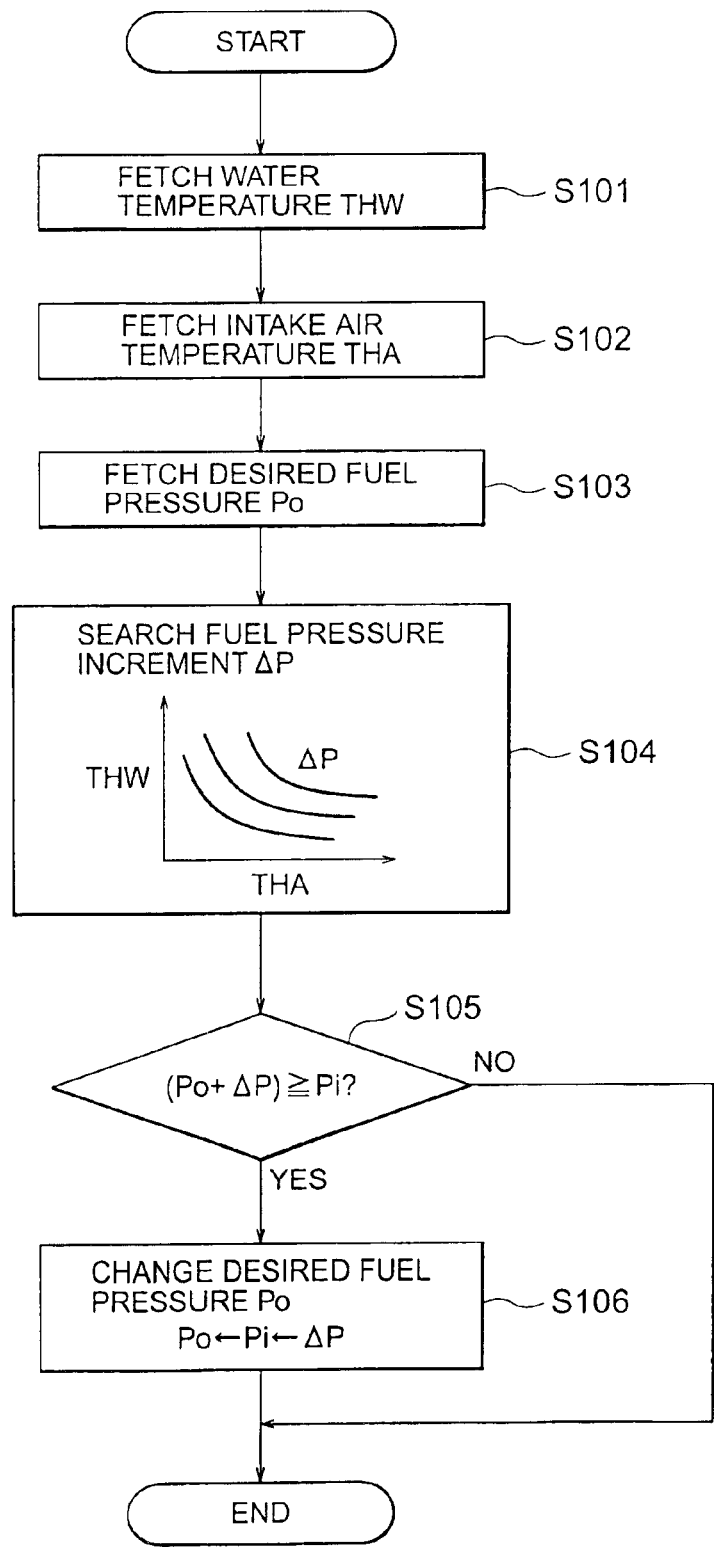
FIG. 5 is a flow chart for illustrating control operation performed by the fuel pressure control apparatus according to the first embodiment of the invention.

The processing routine shown in FIG. 5 is executed by the ECU 10 in synchronism with, for example, the interrupt timing of the crank angle signal SGT.

Referring to FIG. 5, the fuel pressure increase estimating means 103 fetches the water temperature THW from the water temperature sensor 12 in a step S101 while fetching the intake air temperature THA from the intake air temperature sensor 13 in a step S102. On the other hand, the desired fuel pressure limiting means 106 fetches the current desired fuel pressure Po from the desired fuel pressure computing module 105 in a step S103.

In succession, the fuel pressure increase estimating means 103 searches the fuel pressure increment or deviation ΔP estimated from the fuel pressure increase characteristic (e.g. characteristic data shown in FIG. 4) previously stored in the ECU 10 at the time point when the engine operation is stopped on the basis of the water temperature THW and the intake air temperature THA fetched in the steps S101 and S102, respectively (step S104).

Subsequently, the desired fuel pressure limiting means 106 compares the sum value of the current desired fuel pressure Po fetched in the step S103 and the fuel pressure increment or deviation ΔP retrieved in the step S104 (the sum value representing the estimated maximum reachable fuel pressure after the stoppage of the engine operation) with the critical actuation pressure Pi of the fuel injection valve 1, to thereby make decision as to whether or not the sum value (=Po+ΔP) is greater than the value of the critical actuation pressure Pi inclusive in a step S105.

When it is decided in the step S105 that (Po+ΔP)≧Pi (i.e., when the decision step S105 results in affirmation "YES"), then the current desired fuel pressure Po (maximum value) is updated to the value resulting from the subtraction of the fuel pressure increment ΔP from the critical actuation pressure Pi in a step S106, whereupon the processing routine shown in FIG. 5 is exited.

On the other hand, when it is decided in the step S105 that (Po+ΔP)<Pi (i.e., when the decision step S105 results in negation "NO"), the processing routine shown in FIG. 5 is terminated without executing the processing for suppressing the desired fuel pressure Po (step S106).

Thereafter, the fuel pressure PF prevailing within the fuel rail 2 is controlled on the basis of the updated desired fuel pressure Po.

At this juncture, it should be mentioned that although one fuel pressure rise characteristic (see e.g. one of the characteristics shown in FIG. 4) is employed as the fuel pressure rise characteristic upon stoppage of the engine operation for determining by the data map search the increment ΔP of the fuel pressure PF without taking into consideration variation of the initial fuel pressure immediately after the stoppage of the engine operation, the increment ΔP of the fuel pressure PF may equally be arithmetically determined or computed on the basis of the characteristic data which differs in dependence on the initial fuel pressures by storing in advance in the ECU 10 a plurality of characteristic data measured experimentally, respectively, for the initial fuel pressures immediately after the stoppage of the engine operation. Needless to say, by adopting the processing method just above, the prediction or estimation accuracy of the fuel pressure increment ΔP can be enhanced.

As is apparent from the foregoing, by adding together the desired fuel pressure Po set previously as a function of the operation state of the internal combustion engine and the increment ΔP of the fuel pressure PF after the stoppage of the engine operation as estimated by the fuel pressure increase estimating means 103 and by limiting the maximum value of the desired fuel pressure Po so that the sum value resulting from the addition (=Po+ΔP) does not exceed the critical actuation pressure Pi of the fuel injection valve, it can be avoided that the engine operation is continued after the manipulation for engine stoppage and that the engine operation performance is thereby impaired. Further, it is possible to restart the operation of the internal combustion engine with very high reliability because the fuel pressure PF within the fuel rail 2 is prevented from reaching or exceeding the critical actuation pressure Pi of the fuel injection valve 1 even if the fuel pressure PF increases due to the temperature rise of the fuel resident within the fuel rail 2 after the stoppage of the engine operation.

Embodiment 2

In the case of the fuel pressure control apparatus according to the first embodiment of the present invention, the fuel pressure increase estimating means 103 and the desired fuel pressure limiting means 106 are provided for restricting or limiting the maximum value of the desired fuel pressure Po when it is predicted that the fuel pressure PF after the stoppage of the engine operation reaches the level equal to or higher than the critical actuation pressure Pi of the fuel injection valve 1. By contrast, in the fuel pressure control apparatus according to a second embodiment of the present invention, the fuel pressure control apparatus is so arranged that the control for lowering the fuel pressure PF within the fuel rail 2 is realized by opening the electromagnetic pressure control valve 18 while delaying the power-off timing of the ECU 10 immediately after the stoppage of the engine operation.

In the following, description will be made of the fuel pressure control apparatus according to the second embodiment of the invention, which apparatus is so arranged as to carry out a pressure reduction control by opening the electromagnetic pressure control valve 18 immediately after the stoppage of the engine operation.

Figure 6:
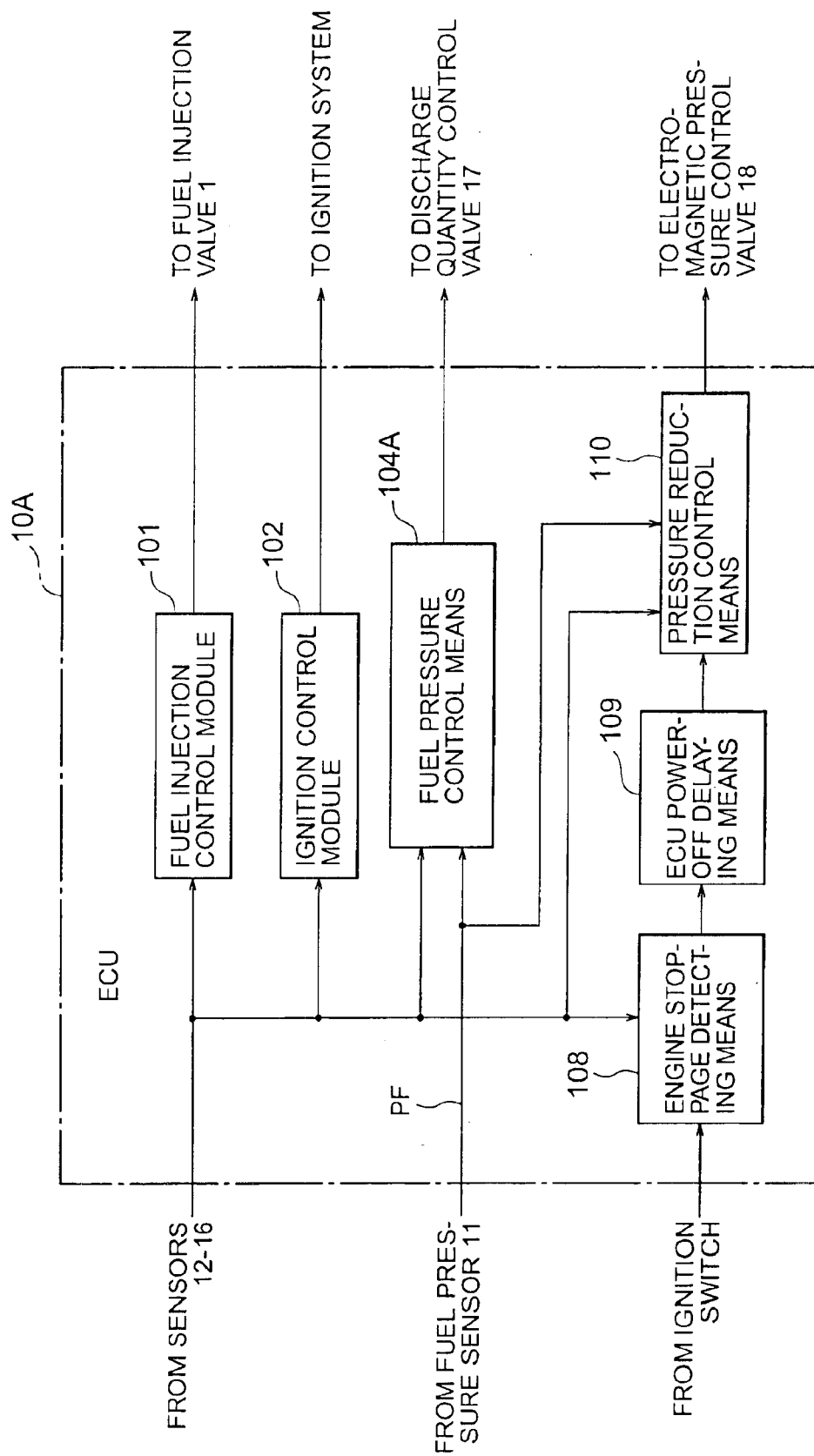
FIG. 6 is a block diagram showing a functional arrangement of an electronic control unit (ECU) incorporated in the fuel pressure control apparatus for the cylinder injection type internal combustion engine according to a second embodiment of the present invention.

FIG. 6 is a block diagram showing a functional arrangement of an electronic control unit (ECU) 10A employed in the fuel pressure control apparatus according to the second embodiment of the present invention. In the figure, those described hereinbefore by reference to FIG. 2 are denoted by the same reference symbol affixed with or without "A", as the case may be.

Incidentally, the structure of the fuel injection system in general according to the second embodiment of the invention is essentially same as that shown in FIG. 1 except that some functions incorporated in the ECU 10A are modified.

Referring to FIG. 6, the fuel pressure control means 104A includes the desired fuel pressure computing module 105 and the discharge quantity control module 107 mentioned hereinbefore by reference to FIG. 2.

The ECU 10A includes an engine stoppage detecting means 108 for detecting stoppage of the engine operation in response to opening or turn-off (OFF operation) of the ignition switch, an ECU power-off delaying means 109 for delaying the power-off timing of the ECU 10A immediately after the stoppage of the engine operation, and a pressure reduction control means 110 for controlling reduction of the fuel pressure PF by opening the electromagnetic pressure control valve 18 in response to the ECU power-off delaying means 109.

The electromagnetic pressure control valve 18 is designed to be opened upon electrical energization under the control of the ECU 10A to establish communication between the fuel rail 2 and the inlet port of the high pressure fuel pump 5 through the medium of the return pipe 19 for thereby reducing the fuel pressure PF within the fuel rail 2.

Thus, the pressure reduction control of the fuel pressure PF can be carried out for a predetermined time immediately after the stoppage of the engine operation through cooperation of the electromagnetic pressure control valve 18 and the return pipe 19 provided in association with the fuel rail 2.

At this juncture, it is to be mentioned that the predetermined delay time validated by the ECU power-off delaying means 109 is so set as to correspond to the period during which the temperature internally of the fuel rail 2 rises.

To say in another way, the predetermined delay time mentioned above is so set as to offset the temperature rise period after the electromagnetic pressure control valve 18 has been opened so that the fuel pressure PF within the fuel rail 2 can continuously be lowered or reduced from the ordinarily expected maximum fuel pressure to an ambient pressure equivalent level during the predetermined time mentioned above. In this conjunction, the response time (equivalent to the above-mentioned predetermined delay time) sufficient for the fuel pressure PF to lower from the maximum fuel pressure value to the ambient pressure equivalent value should desirably be determined in advance through experimental procedure.

The engine stoppage detecting means 108 and the pressure reduction control means 110 are designed to fetch the various sensor informations (engine operation state information) as occasion requires. Additionally, the pressure reduction control means 110 is designed to fetch the detected information (fuel pressure PF) derived from the output of the fuel pressure sensor 11 as well.

Next, referring to the flowchart shown in FIG. 7 together with FIG. 6, description will be made of the control operation carried out by the fuel pressure control apparatus according to the second embodiment of the invention.

Figure 7:
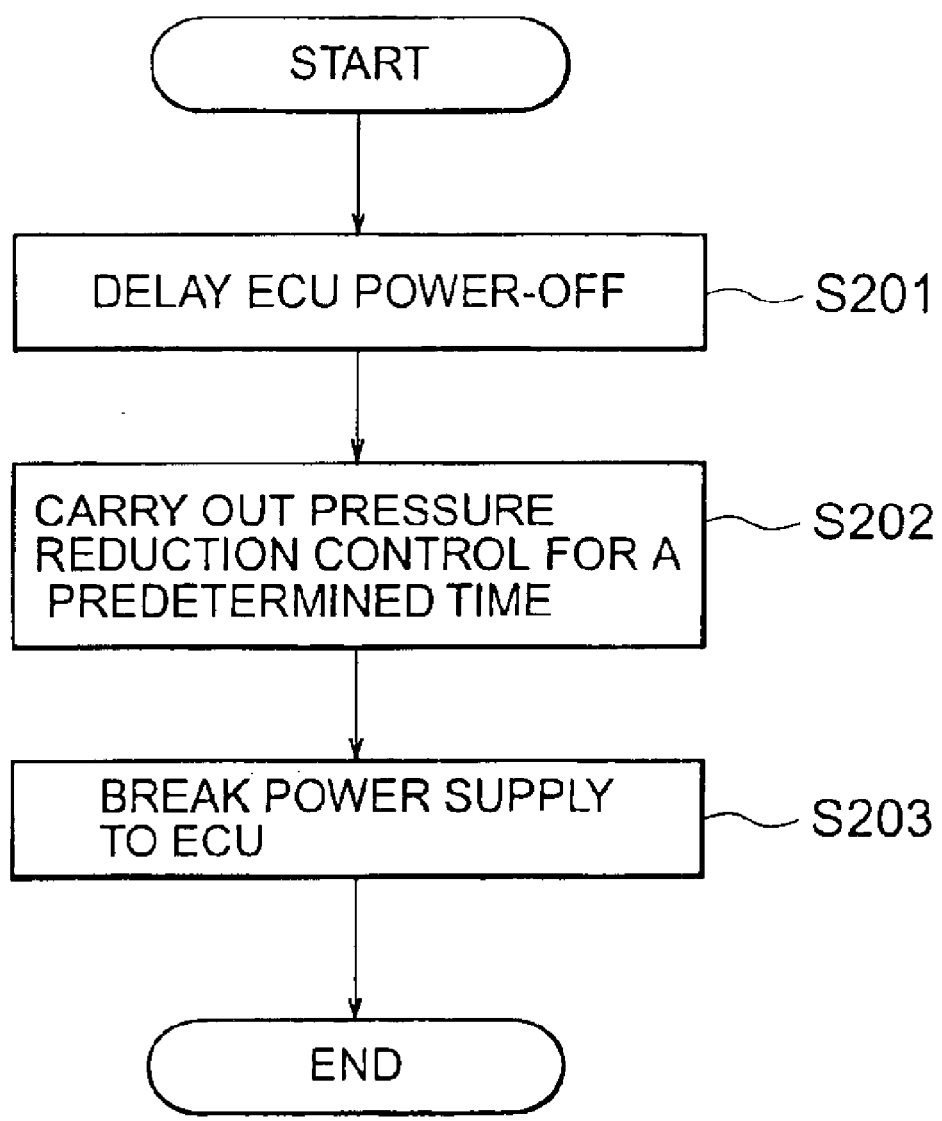
FIG. 7 is a flow chart for illustrating control operation performed by the fuel pressure control apparatus according to the second embodiment of the invention.

The processing routine shown in FIG. 7 is executed only once by the ECU 10A upon stoppage of the engine operation (i.e., upon turn-off of the ignition switch).

Referring to FIG. 7, when the ignition switch is opened or turned off by the driver of the motor vehicle equipped with the fuel pressure control apparatus now under consideration, the stoppage of the engine operation is detected by the engine stoppage detecting means 108, whereon the power supply to the ECU 10A is interrupted with a delay of the predetermined time mentioned previously by the ECU power-off delaying means 109 (step S201).

Thus, the pressure reduction control is carried out by the pressure reduction control means 110 for the predetermined delay time even after the ignition switch has been turned off (step S202).

More specifically, the electromagnetic pressure control valve 18 installed in association with the fuel rail 2 is opened, whereby the fuel of high pressure contained within the fuel rail 2 is discharged toward the discharge port of the fuel tank 6 and the intake port of the high pressure fuel pump 5 through the return pipe 19. Thus, the fuel pressure PF within the fuel rail 2 is reduced.

Thereafter, the power supply to the ECU 10A is interrupted (power-off of the ECU 10A) in a step S203, whereupon the processing routine shown in FIG. 7 comes to an end.

As is apparent from the above, by reducing the fuel pressure PF by opening the electromagnetic pressure control valve 18 by means of the pressure reduction control means 110 for the predetermined delay time immediately after the stoppage of the engine operation, the fuel pressure PF which increases as the temperature of the fuel within the fuel rail 2 rises after the stoppage of the engine operation is prevented from attaining or exceeding the critical actuation pressure Pi of the fuel injection valve 1. Thus, the internal combustion engine can be restarted with enhanced reliability without impairing the operation performance of the engine.

Besides, by driving or activating the pressure reduction control means 110 for the necessary minimum predetermined time, the power consumption of the on-vehicle battery by the pressure reduction control means 110 can be suppressed to a minimum.

Furthermore, since the restrictive correction of the control parameter (desired fuel pressure Po) is not carried out during the operation of the internal combustion engine, no restriction is imposed on the ordinary operation behavior of the engine and hence the motor vehicle although the manufacturing cost increases more or less as compared with the apparatus described hereinbefore in conjunction with the first embodiment of the invention.

Embodiment 3

In the case of the fuel pressure control apparatus according to the second embodiment of the invention, the pressure reduction control is carried out by opening the electromagnetic pressure control valve 18 for the preset predetermined delay time after the stoppage of the engine operation. The fuel pressure control apparatus according to a third embodiment of the present invention is so arranged that the pressure reduction control is performed for a time required for the fuel pressure PF detected by the fuel pressure sensor 11 becomes equal to or lower than the critical actuation pressure Pi of the fuel injection valve 1.

In the following, description will be made of the fuel pressure control apparatus according to the third embodiment of the invention which is so arranged that the pressure reduction control is performed for a time taken for the fuel pressure PF to become equal to or lower than the critical actuation pressure Pi of the fuel injection valve 1.

Figure 8:
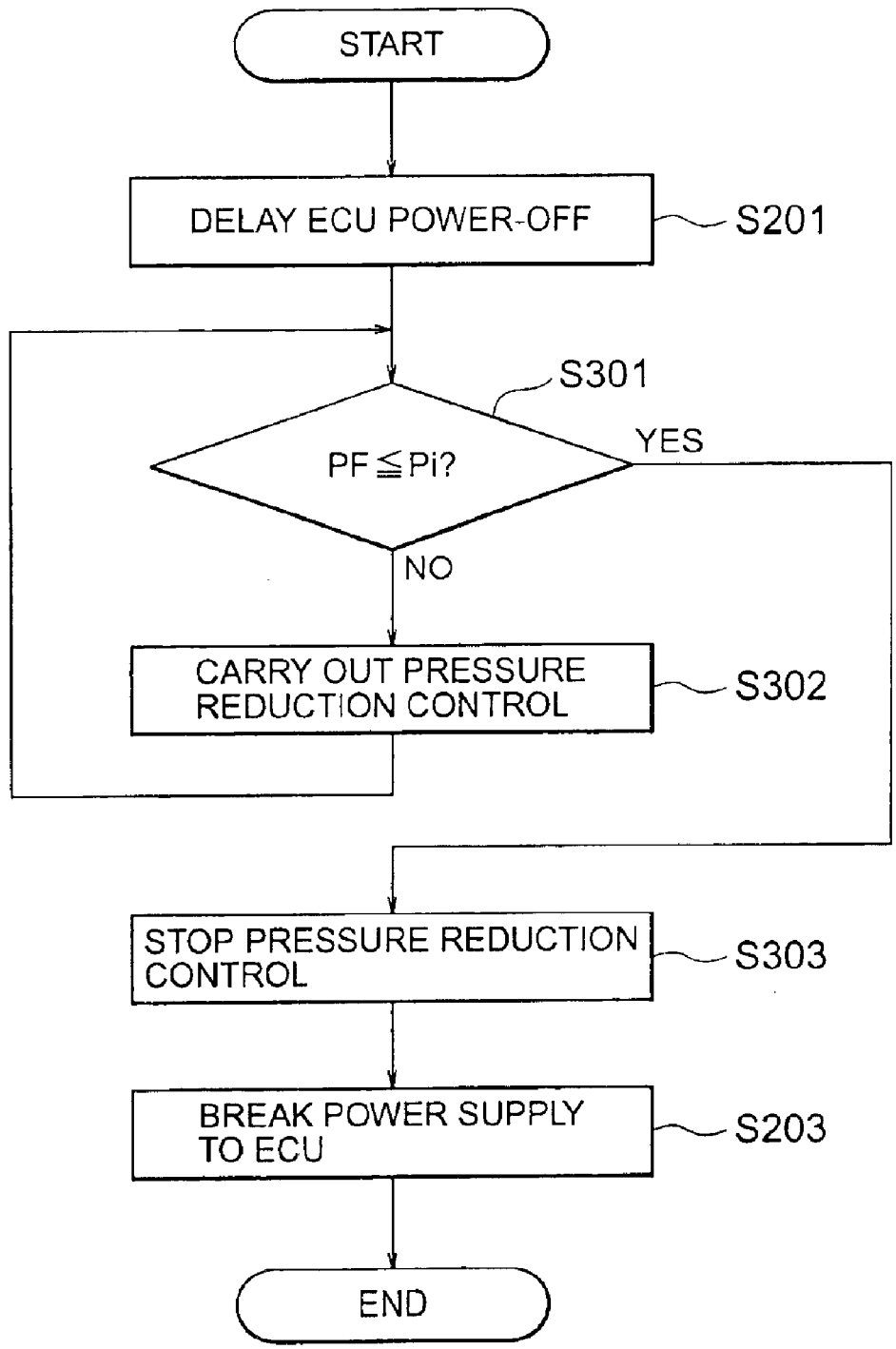
FIG. 8 is a flow chart for illustrating control operation performed by the fuel pressure control apparatus for the cylinder injection type internal combustion engine according to a third embodiment of the present invention.

FIG. 8 is a view for illustrating in a flow chart the control operation performed by the fuel pressure control apparatus according to the third embodiment of the invention, wherein the processings of the steps S201 and S203 are same as those mentioned previously by reference to FIG. 7.

Parenthetically, the functional configuration of the ECU according to the third embodiment of the invention is essentially same as the one described hereinbefore by reference to FIG. 6.

Now referring to FIG. 8, when the ignition switch is turned off, the power-off of the ECU 10A is delayed as in the case of the second embodiment (see FIG. 7) in a step S201, as a result of which processing steps mentioned below are executed even after the ignition switch has been turned off.

In a step S301, decision is made by the pressure reduction control means 110 (see FIG. 7) as to whether or not the fuel pressure PF detected by the fuel pressure sensor 11 is lower than the critical actuation pressure Pi of the fuel injection valve 1.

When it is determined in the step S301 that PF>Pi (i.e., when the decision step S301 results in "NO"), the pressure reduction control is effectuated by opening the electromagnetic pressure control valve 18 in a step S302, whereon the step S301 is resumed.

On the other hand, when it is determined in the step S301 that PF≦Pi (i.e., when the decision step S301 results in "YES"), the pressure reduction control is interrupted by closing the electromagnetic pressure control valve 18 in a step S303, whereon the power supply to the ECU 10A is broken (power-off of the ECU 10A) in a step S203. Then, the processing routine shown in FIG. 8 comes to an end.

As a result of this, the fuel pressure PF after the stoppage of the engine operation can be prevented from attaining or exceeding the critical actuation pressure Pi of the fuel injection valve 1. Thus, the internal combustion engine can be restarted with enhanced reliability without impairing the operation performance.

At this juncture, it is to be added that although the fuel pressure PF is compared with the critical actuation pressure Pi of the fuel injection valve 1, the fuel pressure PF maybe compared with other predetermined value. By way of example, such initial fuel pressure value which indicates the maximum value of the fuel pressure PF reachable due to the temperature rise after the stoppage of the engine operation from attaining the critical actuation pressure Pi is experimentally determined, and the initial fuel pressure value as determined is stored as the preset predetermined value.

As is apparent from the above, by opening the electromagnetic pressure control valve 18 for a time required for the fuel pressure PF to become equal to or lower than the critical actuation pressure Pi (preset predetermined value) of the fuel injection valve 1, the fuel pressure PF which will increase in accompanying the temperature rise of the fuel within the fuel rail 2 after the stoppage of the engine operation is prevented from reaching the critical actuation pressure Pi of the fuel injection valve 1. Thus, the restart of the internal combustion engine can be ensured with high reliability without degrading the operation performance.

Of course, in the case where the fuel pressure PF does not reach the critical actuation pressure Pi regardless of the temperature rise of the fuel within the fuel rail 2 after the stoppage of the engine operation, such arrangement can be adopted that the pressure reduction control described above is not inadvertently carried out.

Many features and advantages of the present invention are apparent from the detailed description and thus it is intended by the appended claims to cover all such features and advantages of the apparatus which fall within the spirit and scope of the invention. Further, since numerous modifications and changes will readily occur to those skilled in the art, it is not desired to limit the invention to the exact construction and operation illustrated and described. Accordingly, all suitable modifications and equivalents may be resorted to, falling within the scope of the invention.

What is claimed is:

1. A fuel pressure control apparatus for a cylinder injection type internal combustion engine, comprising:

fuel injection valves for injecting fuel directly into combustion chambers of individual cylinders, respectively, of said internal combustion engine;

a fuel rail connected to said fuel injection valves for containing the fuel of a high pressure;

a fuel pressure sensor for detecting the pressure of said fuel contained within said fuel rail as a fuel pressure;

an intake air temperature sensor for detecting a temperature of intake air of said internal combustion engine or alternatively an ambient temperature thereof as an intake air temperature;

a water temperature sensor for detecting a temperature of cooling water of said internal combustion engine as a water temperature;

a high pressure fuel pump for supplying said fuel of high pressure to said fuel rail;

fuel pressure control means for variably controlling said fuel pressure so that said fuel pressure coincides with a desired fuel pressure which conforms to an operation state of said internal combustion engine; and fuel pressure increase estimating means for estimating an increment of said fuel pressure after stoppage of operation of said internal combustion engine on the basis of said intake air temperature and said water temperature detected during operation of said internal combustion engine, wherein said fuel pressure control means includes desired fuel pressure limiting means for limiting a maximum value of said desired fuel pressure so that a sum value of said desired fuel pressure and said increment of said fuel pressure does not exceed a critical actuation pressure of the fuel injection valve beyond which a failure of fuel injection may occur.

2. A fuel pressure control apparatus for a cylinder injection type internal combustion engine, comprising:

fuel injection valves for injecting fuel directly into combustion chambers of individual cylinders, respectively, of said internal combustion engine;

a fuel rail connected to said fuel injection valves for containing the fuel of a high pressure;

a fuel pressure sensor for detecting the pressure of said fuel contained within said fuel rail as a fuel pressure;

a high pressure fuel pump for supplying the fuel contained in a fuel tank to said fuel rail as said fuel of high pressure;

fuel pressure control means for variably controlling said fuel pressure so that said fuel pressure coincides with a desired fuel pressure which conforms to an operation state of said internal combustion engine;

a normally closed type electromagnetic pressure control valve provided to make it possible to establish communication between an intake port of said high pressure fuel pump or alternatively said fuel tank on one hand and said fuel rail on the other hand; and pressure reduction control means for opening said electromagnetic pressure control valve immediately after stoppage of operation of said internal combustion engine.

3. A fuel pressure control apparatus for a cylinder injection type internal combustion engine according to claim 2, wherein said pressure reduction control means is so designed as to realize pressure reduction control by opening said electromagnetic pressure control valve over a predetermined period corresponding to a period during which temperature within said fuel rail rises.

4. A fuel pressure control apparatus for a cylinder injection type internal combustion engine according to claim 2, wherein said pressure reduction control means is so designed as to realize pressure reduction control by opening said electromagnetic pressure control valve for a period taken for said fuel pressure to become equal to or lower than a critical actuation pressure of said fuel injection valve.

* * * * *